US010298309B2

(12) United States Patent
Hessler et al.

(10) Patent No.: US 10,298,309 B2
(45) Date of Patent: May 21, 2019

(54) WIRELESS DEVICE, A NETWORK NODE AND METHODS THEREIN FOR DETERMINING THE QUALITY OF UPLINK BEAMFORMING DIRECTIONS IN A WIRELESS COMMUNICATIONS NETWORK

(71) Applicant: Telefonaktiebolaget LM Ericsson (publ), Stockholm (SE)

(72) Inventors: Martin Hessler, Linköping (SE); Erik Eriksson, Linköping (SE); Jonas Fröberg Olsson, Ljungsbro (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 15/023,426

(22) PCT Filed: Feb. 12, 2016

(86) PCT No.: PCT/SE2016/050111
§ 371 (c)(1),
(2) Date: Mar. 21, 2016

(87) PCT Pub. No.: WO2017/138852
PCT Pub. Date: Aug. 17, 2017

(65) Prior Publication Data
US 2018/0034529 A1 Feb. 1, 2018

(51) Int. Cl.
*H04W 72/04* (2009.01)
*H04B 7/06* (2006.01)
(Continued)

(52) U.S. Cl.
CPC .......... *H04B 7/0632* (2013.01); *H04B 7/024* (2013.01); *H04B 7/0404* (2013.01); *H04B 7/0695* (2013.01)

(58) Field of Classification Search
CPC .... H04B 7/0632; H04B 7/024; H04B 7/0404; H04B 7/0695
See application file for complete search history.

(56) References Cited

U.S. PATENT DOCUMENTS

| 2013/0258885 A1* | 10/2013 | Yu ........................ H04W 16/28 370/252 |
| 2016/0007337 A1* | 1/2016 | Hessler ................... H04B 7/024 370/230 |

(Continued)

FOREIGN PATENT DOCUMENTS

| WO | WO 2014135186 A1 * | 9/2014 | ............. H04B 7/024 |
| WO | WO 2015080645 A1 * | 6/2015 | ............. H04B 7/024 |

*Primary Examiner* — Pakee Fang
(74) *Attorney, Agent, or Firm* — Murphy, Bilak & Homiller, PLLC

(57) ABSTRACT

A method performed by a wireless device (121) for determining the quality of uplink beamforming directions in a wireless communications network (100) is provided. The wireless device (121) receives configuration information indicating uplink channel state information, CSI, processes for uplink beamforming directions. Then, the wireless device (121) transmits reference signals for one or more uplink beamforming directions on uplink transmission resources of corresponding one or more uplink CSI processes. The wireless device (121) also receives one or more uplink CSI process reports for the one or more uplink CSI processes. Then, the wireless device (121) determines the quality of at least one uplink beamforming direction using the one or more uplink CSI process reports. A wireless device (121) for determining the quality of uplink beamforming directions in a wireless communications network (100) is also provided.
Furthermore, a network node and a method therein for enabling a wireless device (121) to determine a quality of
(Continued)

uplink beamforming directions in a wireless communications network (100) are also provided.

38 Claims, 7 Drawing Sheets

(51) Int. Cl.
*H04B 7/024* (2017.01)
*H04B 7/0404* (2017.01)

(56) References Cited

U.S. PATENT DOCUMENTS

| | | | |
|---|---|---|---|
| 2016/0142189 A1* | 5/2016 | Shin | H04L 5/0048 |
| | | | 370/329 |
| 2016/0270113 A1* | 9/2016 | Sun | H04W 28/16 |
| 2017/0180016 A1* | 6/2017 | Park | H04B 7/024 |

\* cited by examiner

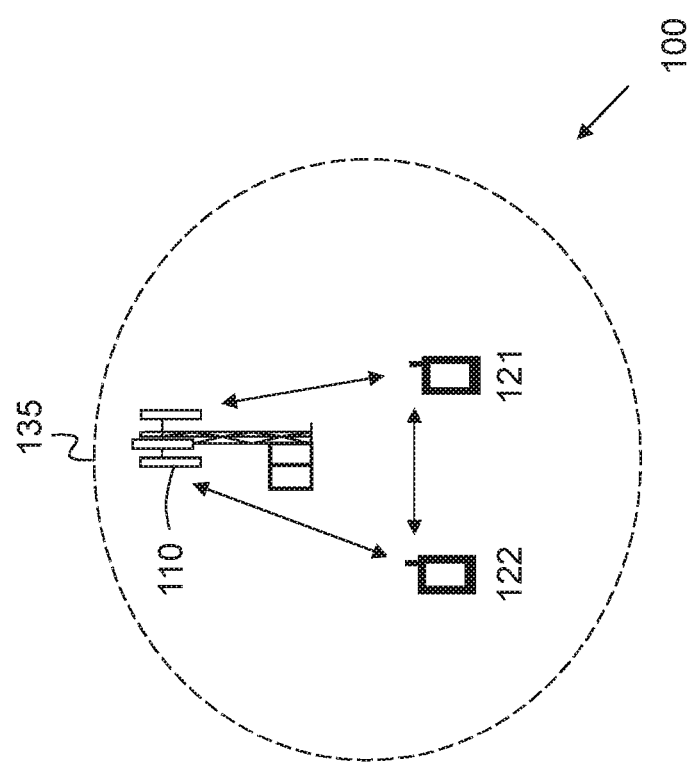

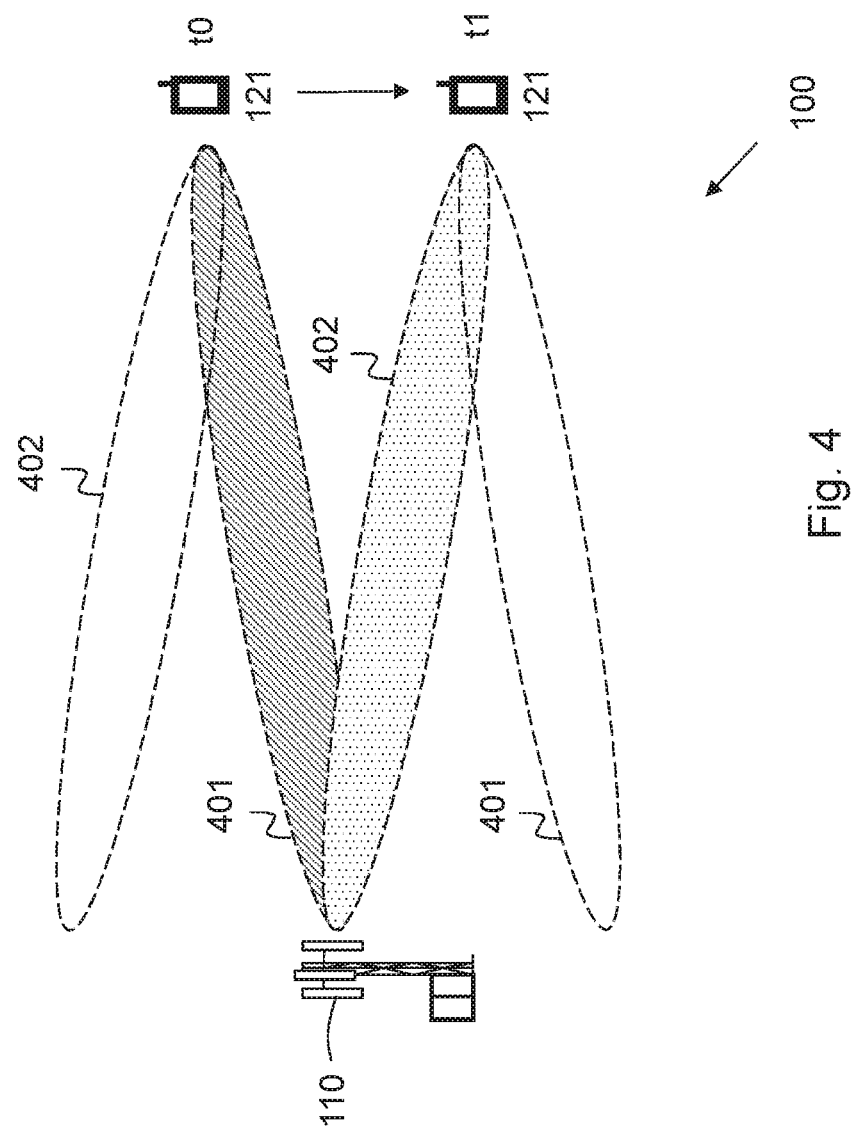

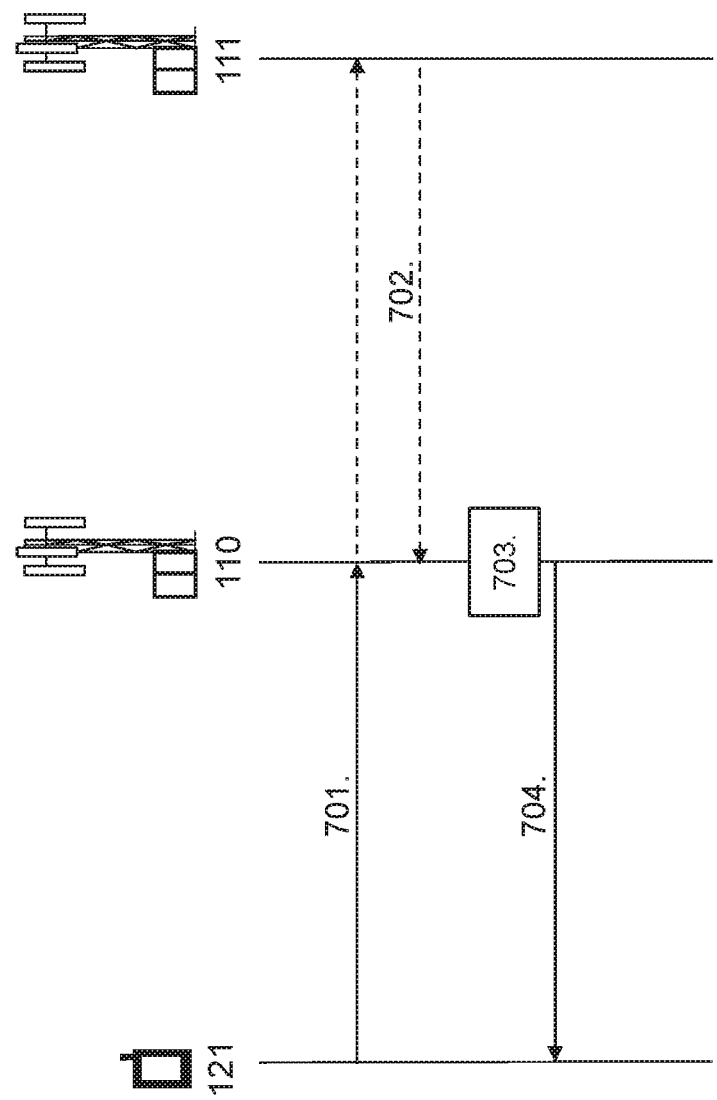

WIRELESS DEVICE, A NETWORK NODE AND METHODS THEREIN FOR DETERMINING THE QUALITY OF UPLINK BEAMFORMING DIRECTIONS IN A WIRELESS COMMUNICATIONS NETWORK

TECHNICAL FIELD

Embodiments herein relate to beamforming in a wireless communications network. In particular, embodiments herein relate to a wireless device and method therein for determining the quality of uplink beamforming directions in a wireless communications network, as well as, a network node and method therein for enabling a wireless device to determine the quality of uplink beamforming directions in a wireless communications network.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication.

A wireless communications network typically comprises radio base stations providing radio coverage over at least one respective geographical area forming a cell. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station. The wireless devices transmit data over an air or radio interface to the radio base stations in uplink, UL, transmissions and the radio base stations transmit data over an air or radio interface to the wireless devices in downlink, DL, transmissions.

Channel-State Information, CSI, Measurement and Feedback

In many wireless communications systems, Channel-State Information, CSI, feedback is important for obtaining a good performance. In the downlink, reference signals, i.e. signals comprising reference symbols, are transmitted from a radio base station to a wireless device in order to enable the wireless device to measure the downlink channel in order to estimate the channel state. The wireless device then reports a downlink CSI feedback to the radio base station. The downlink CSI feedback typically comprise a Channel-Quality Indicator, CQI, value and a Rank Indicator, RI, value. More detailed downlink CSI reports may comprise frequency-selective CQI and/or Pre-coding Matrix Indicator, PMI, values. In the uplink, Sounding Reference Signals, SRS, are transmitted from the wireless device to the radio base station. The radio base station may then perform measurements on the SRS and thus determine the CSI information that the radio base station may, for example, use in selecting an uplink transmission format or transmission parameters, such as, e.g. pre-coding, rank, modulation and coding scheme, for uplink transmissions from the wireless device.

The 3GPP Long Term Evolution, LTE, system supports CSI-reporting schemes that rely on the Reference Symbols, RS, being transmitted periodically; Cell-specific Reference Symbols, CRS, are sent every subframe while user-specific CSI-RS may be sent with a larger periodicity. Wireless devices using Transmission Mode 10, TM10, rely solely on CSI-RS resources, while other wireless devices typically use the CRS at least for interference measurements.

Wireless devices using TM10 may be configured to report CSI for multiple CSI processes. Each CSI process may have different CSI measurement resources. A CSI measurement resource comprise a CSI Reference Symbol, CSI-RS, resource and a CSI Interference Measurement, CSI-IM, resource. Both the CSI-RS and the CSI-IM resources are divided into sets of resources, where each set is identified by a CSI-RS configuration index. Each CSI-RS configuration index comprise resources in every Physical Resource Block, PRB, in the frequency band. A subframe configuration specifies a subframe periodicity, and a subframe offset specifies for the wireless device at which time instances the respective measurement resources are available.

Massive MIMO

Future Radio Access Technologies, RATs, are expected to support a lot more transmit antennas, and then particularly on the network side in the wireless communications network. For example, in the context of "Massive MIMO", the number of antennas is expected to be very large. This means that a single transmission point may have antennas ranging in the order of several hundreds or even thousands of antenna elements. A large, albeit much smaller, number of antennas could potentially be expected also in the wireless device at high carrier frequencies. This is because the physical size of the antenna elements at those frequencies can be made very small.

This increased number of antenna elements makes it possible to form more directive antenna patterns as compared to what is possible with current older antenna systems, Hence, wireless communications networks incorporating more capable RATs may focus its transmitted and/or received signal much more efficiently towards the wireless device being served, whilst suppressing the interference from/to other wireless devices. Each such direction is typically referred to as a 'beam' or "beamforming direction", whereas the entire process may be referred to as 'beamforming'.

Differential Beamforming

"Massive MIMO" is usually described as a technique for a Time Division Duplex, TDD, system, but not for a Frequency Division Duplex, FDD, system. This is because, for TDD, the radio channel is reciprocal and hence uplink channel estimation on the SRS additionally also provides corresponding downlink channel estimate which may be used by the radio base station to form its beam towards the wireless device. However, for FDD, obtaining a downlink channel estimate would require too much overhead. Firstly, this is because reference signals would need to be transmitted by the radio base station upon which the wireless device may perform channel measurements in order to determine its channel estimates. This alone would consume a large portion of the physical transmission resources in the wireless communications network. Secondly, the channel estimates also needs to be communicated back to the radio base station, which in turn would further consume a lot of physical transmission resources when the number of antennas is large.

An alternative solution to this problem in FDD systems may be to perform beamforming for the CSI-RS and utilize the support of multiple CSI processes. A wireless device would then be configured with multiple CSI processes, wherein the CSI-RS are beam-formed using different beams, and the CSI reported by the wireless device would then be used by the radio base station to form new beams. Hence, by utilizing the reported pre-coders and quality estimates from the wireless device, an iterative method of obtaining new beams is possible. All such iterative methods may be viewed as different forms of differential beamforming.

LTE PUSCH Power Control

In 3GPP LTE systems, power control is applied for uplink physical channels. The aim for the power control is to maintain a target received power spectral density at the receiving radio base station. For the uplink data channel, i.e. the Physical Uplink Shared Channel, PUSCH, the transmitted power by the wireless device in subframe i is determined according to the equation:

$$P_{PUSCH}(i)=\min\{P_{CMAX}, 10\log_{10}(M_{PUSCH}(i))+ P_{O\_PUSCH}(j)+\alpha(j)\cdot PL+\Delta_{TF}(i)+f(i)\}$$

wherein $P_{CMAX}$ is the configured maximum transmit power of the wireless device, $M_{PUSCH}(i)$ is the number of resource blocks allocated for the wireless device, $P_{O\_PUSCH}(j)$ is a parameter consisting of the sum of a cell-specific and a user-specific part provided by higher layer, α is cell-specific parameter configured by higher layers, also known as fractional pathloss compensation factor, PL is the downlink pathless estimate calculated in the wireless device, $\Delta_{TF}$ (i) is a user-specific parameter provided by higher layers, and f(i) is user-specific correction term controlled by TPC commands sent in uplink grants which are transmitted on the PDCCH.

It should also be noted that for later releases of the 3GPP specifications, the power control may be slightly more complicated due to the support of multi-carrier where wireless devices may support multiple serving cells.

SUMMARY

It is an object of embodiments herein to improve channel state measurements in a wireless communication network.

According to a first aspect of embodiments herein, the object is achieved by a method performed by a wireless device for determining the quality of uplink beamforming directions in a wireless communications network. The wireless device receive configuration information indicating one or more uplink channel state information, CSI, processes for uplink beamforming directions. Then, the wireless device transmit reference signals for one or more uplink beamforming directions on uplink transmission resources of corresponding one or more uplink CSI processes. The wireless device also receive one or more uplink CSI process reports for the one or more uplink CSI processes. Further, the wireless device determine the quality of at least one uplink beamforming direction using the one or more uplink CSI process reports.

According to a second aspect of embodiments herein, the object is achieved by a wireless device for determining the quality of uplink beamforming directions in a wireless communications network. The wireless device is configured to receive configuration information indicating one or more uplink CSI processes for uplink beamforming directions. The wireless device is also configured to transmit reference signals for one or more uplink beamforming directions on uplink transmission resources of corresponding one or more uplink CSI processes. The wireless device is further configured to receive one or more uplink CSI process reports for the one or more uplink CSI processes. Furthermore, the wireless device is configured to determine the quality of at least one uplink beamforming direction using the one or more uplink CSI process reports.

According to a third aspect of embodiments herein, the object is achieved by a method performed by a network node for enabling a wireless device to determine a quality of uplink beamforming directions in a wireless communications network. The network node transmit configuration information to the wireless device, said configuration information indicating one or more uplink CSI processes for uplink beamforming directions. Then, the network node receive reference signals from the wireless device for one or more uplink beamforming directions on uplink transmission resources of corresponding uplink CSI processes. Also, the network node determine one or more uplink CSI process reports using the received reference signals on the uplink transmission resources of the uplink CSI processes. Then, the network node transmit the determined one or more uplink CSI process reports for the uplink CSI processes to the wireless device.

According to a fourth aspect of embodiments herein, the object is achieved by a network node for enabling a wireless device to determine a quality of uplink beamforming directions in a wireless communications network. The network node is configured to transmit configuration information to the wireless device, said configuration information indicating one or more uplink CSI processes for uplink beamforming directions. Also, the network node is configured to receive reference signals from the wireless device for one or more uplink beamforming directions on uplink transmission resources of corresponding uplink CSI processes. The network node is further configured to determine one or more uplink CSI process reports using the received reference signals on the uplink transmission resources of the uplink CBI processes. Furthermore, the network node is configured transmit the determined one or more uplink CSI process reports for the uplink CSI processes to the wireless device.

By introducing CSI processes in the uplink for different beamforming directions of a wireless device, the wireless device is able to determine the quality of different uplink beamforming directions based on CSI process reports from the network node. While this enables support for both user-controlled and/or network-controlled beamforming of uplink transmissions towards the network node, it also makes the uplink beamforming of the wireless device visible via the CSI process reporting.

Hence, channel state measurements in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 1 is a schematic block diagram illustrating embodiments of network nodes and wireless devices in a wireless communications network, FIG. 4 is another signaling diagram illustrating embodiments of network nodes and wireless devices, FIG. 7 is a flowchart depicting embodiments of a method in a network node.

DETAILED DESCRIPTION

Figure 3:
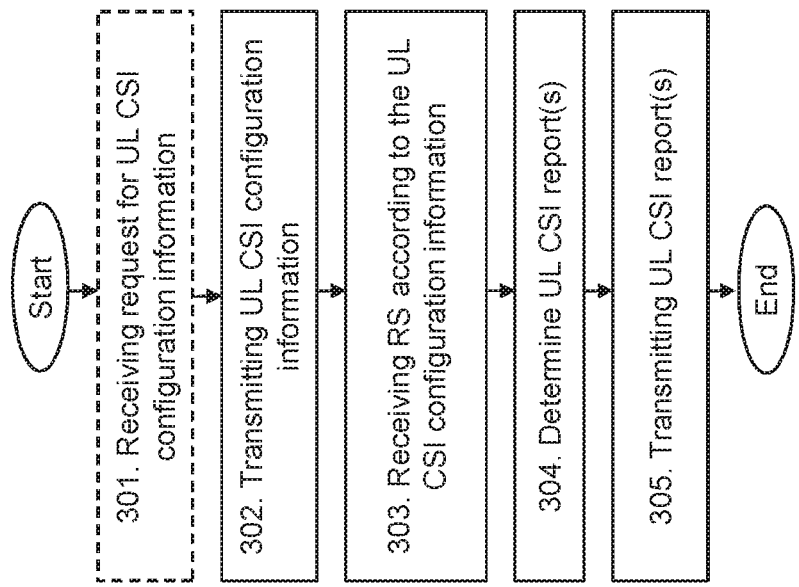
FIG. 3 is a schematic overview of uplink beamforming directions according to embodiments of network nodes and wireless devices.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless communications network 100 in which embodiments herein may be implemented. The wireless communications network 100 may be a radio communications network, such as, e.g. LTE, WCDMA, GSM, 3GPP cellular network, or any other cellular network or system. The wireless communications network 100 may also, for example, be referred to as a cellular network or system or a telecommunications network.

The wireless communications network 100 comprises a radio base station, which is referred to herein as a network node 110. The network node 110 is a network unit capable to serve wireless devices which are located within its radio coverage area, i.e. cell 115. The network node 110 may e.g. be an eNB, eNodeB, or a Home Node B, a Home eNode B, femto Base Station (BS), pico BS or any other network unit capable to serve a wireless device or a machine type communication device in the wireless communications network 100.

A wireless device 121 is shown located within the cell 115 which is served by the network node 110. The wireless device 121 is configured to communicate within the wireless communications system 100 via the network node 110 over a radio link when the first wireless device 121 is present in the cell 115. The wireless device 121 may be capable of operating or performing measurements in one or more frequencies, carrier frequencies, component carriers or frequency bands. The wireless device 121 may also be interchangeably referred to as a mobile station, a terminal, a wireless terminal, and/or a user equipment, UE. It may here also be pointed out that these terms as used herein should be understood by the skilled in the art as non-limiting terms comprising any wireless device or node equipped with a radio interface allowing for receiving and transmitting signals to or from the network node 110.

For example, the wireless device 121 may, for example, be a mobile terminal or a wireless terminal, a mobile, a mobile phone, a sensor, a computer such as for example a laptop, a Personal Digital Assistant (PDA) or a tablet computer with wireless capability, a wireless terminal used for Machine Type Communication (MTC), a Machine-to-Machine (M2M) communication device, a wireless device used for Device-to-Device (D2D) communication, a fixed or mobile relay or relay node, a device equipped with a wireless interface, such as a printer or a file storage device, or any other radio network unit capable of communicating over a radio link in a wireless communications system 100.

However, it should also be noted that in a Device-to-Device, D2D, communication scenario, another wireless device 122 may herein be referred to as a network node and act according to the embodiments of the network node 110 described herein, except where it is explicitly described otherwise. In this scenario, wireless transmissions of data from the wireless device 121 to the wireless device 122 may correspond to uplink, UL, transmissions, and wireless transmissions of data from the wireless device 122 to the wireless device 121 may correspond to downlink, DL, transmissions.

Embodiments of the network node 110, the wireless device 121 and methods therein will be described in more detail below with reference to FIGS. 2-9.

It should be noted that uplink beamforming directions may also be referred to herein as beams or uplink beams, and uplink Channel State Information, CSI, processes for the uplink beamforming directions also may be referred to herein as Beam State Information, BSI, processes. The latter term may be used for a more detailed description of what the uplink CSI processes are used for in the embodiments herein, i.e. to determine the state or quality of the available uplink beamforming directions of the wireless device 121.

Figure 2:
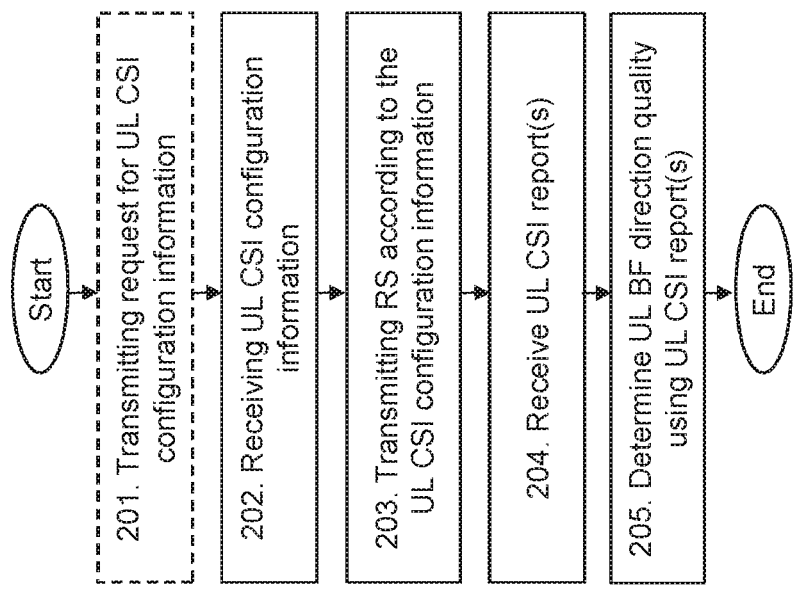
FIG. 2 is a signaling diagram illustrating embodiments of network nodes and wireless devices.

Example of embodiments of a method performed by a wireless device 121 for determining the quality of uplink beamforming directions in a wireless communications network 100 will now be described with reference to the flowchart depicted in FIG. 2. FIG. 2 is an illustrated example of actions or operations which may be taken by a wireless device 121 in the wireless communication network 100. The method may comprise the following actions.

Action 201

Optionally, the wireless device 121 may first transmit a request for configuration information that indicates one or more uplink CSI processes for uplink beamforming directions. This may be performed by the wireless device 121 when the wireless device 121 is to perform beamforming of an uplink transmission and there is no configuration information relating to uplink beamforming available in the wireless device 121.

In particular, this may be advantageous when the receiver of the uplink beamformed transmission is another wireless device, such as, for example, another wireless device 122 in the wireless communications network 100. In fact, in this case, the wireless device 121 may even be required to transmit such a request. However, this may not be required in case the receiver of the uplink beamformed transmission is the network node 110 in the wireless communications network 100.

Action 202

The wireless device 121 receive configuration information indicating one or more uplink CSI processes for uplink beamforming directions. The configuration information may be received in a downlink transmission from the network node 110, e.g. in response to the transmitted request in Action 201. The configuration information may comprise a configuration of n=1, 2, . . . , N number of uplink CSI processes. Each uplink CSI process may specify uplink transmission resources on which the wireless device 121 may transmit one or more reference signals associated with the uplink CSI process. The reference signals may here refer to signals comprising Reference Symbols, RS.

Further, in some embodiments, the wireless device 121 may receive information indicating an association between a downlink CSI process and one of the one or more uplink CSI processes. This information may also be specified in the received configuration information, or may be received in a separate transmission from the network node 110, such as, e.g. in a grant message. This means that the wireless device 121 may receive an indicator indicating that an uplink CSI process is associated with a downlink CSI process. For example, since the wireless device 121 may already comprise a configuration of a downlink CSI process comprising CSI-RS when receiving the configuration information, the configuration information may comprise an indicator indicating that one of the uplink CSI processes is associated with the downlink CSI process. One example of such an association may be that the receiver used for uplink reference signals for the uplink CSI process is the same as the transmitter of the CSI-RS of the indicated downlink CSI process. This indicated association may then be used by the wireless device 121 to select an uplink beamforming direction for an uplink transmission.

In other words, as the experienced downlink interference is dependent on the uplink beamforming direction of uplink transmissions, the uplink CSI process may be naturally coupled to a downlink CSI process as they may share configuration data. This may advantageously provide less overhead for the uplink transmissions of the wireless device 121.

Action 203

After receiving the configuration information in Action 202, the wireless device 121 transmit reference signals for one or more uplink beamforming directions on uplink transmission resources of corresponding one or more uplink CSI processes. This means that the wireless device 121 may use the uplink transmission resources specified for each of the uplink CSI processes to transmit reference signals for each of the uplink beamforming directions corresponding to each of the uplink CSI processes, respectively. Thus, the wireless device 121 may transmit reference signals for each uplink beamforming direction for which the wireless device 121 is to determine the quality.

Also, in some embodiments, the wireless device 121 may receive information indicating when the wireless device 121 is to perform the transmission of the one or more reference signals. This information may be specified in the configuration information received in Action 202, or may be received in a separate transmission, such as, e.g. in a grant message.

Action 204

In response to the transmission in Action 203, the wireless device 121 receive one or more uplink CSI process reports for the one or more uplink CSI processes. This means that the wireless device 121 may receive an uplink CSI process report for each uplink beamforming direction, i.e. an uplink CSI report for each uplink CSI process which corresponds to each uplink beamforming direction, for which the wireless device 121 transmitted reference signals in Action 203. This means that the wireless device 121 is enabled to determine the quality of all its available uplink beamforming directions in the wireless communications network 100 based on these uplink CSI process reports.

Furthermore, in some embodiments, the wireless device 121 may receive information identifying at least one uplink CSI process and indicating a subset of uplink transmission parameter values for the at least one uplink CSI process. In this way, a network node may 110, for example, control or inform the wireless device 121 about which specific uplink beamforming direction, and thus which uplink transmission parameter values, to use for one or more uplink transmissions. This information may be received in a separate downlink transmission, such as, e.g. in a grant message.

Action 205

The wireless device 121 may then determine the quality of at least one uplink beamforming direction using the one or more uplink CSI process reports. For example, an uplink CSI process report of a CSI process may comprise the quality of a specific uplink beamforming direction associated with this CSI process, whereby the wireless device 121 may determine the quality by checking the quality indicated in the uplink CSI report.

Alternatively, the wireless device 121 may determine the quality of a specific uplink beamforming direction associated with a CSI process on its own based on one or more parameter values in the uplink CSI process report of the CSI process. Here, the wireless device 121 may perform a so-called outer-loop adjustment of the parameter values in the uplink CSI process report in order to determine a quality. For example, the uplink CSI process report may comprise a Channel-Quality Indicator, CQI, value and a Pre-coding Matrix Indicator, PMI, value that the wireless device 121 may correspond or map to a Signal-to-Noise Ratio, SINR. This SINR may then be adjusted to a determined SINR by an adjustment value, which may be determined in the same way as for current downlink CSI processes wherein the adjustment value is determined via HARQ feedback. According to another example, the quality may be indicated by an uplink transmit power value associated with the one or more parameters values in the uplink CSI process report with respect to another uplink transmit power. According to yet another example, the quality is determined as the quality that provides the lowest uplink transmit power, but such that the determined quality is at least above a determined threshold level. The determined threshold level may here be a fixed threshold level, or depend on one or more qualities, such as, e.g. a mean value, a max value, a min value or an offset from the max value, etc.

Furthermore, in some embodiments, in case the wireless device 121 received information identifying at least one uplink CSI process and indicating a subset of uplink transmission parameter values for the at least one uplink CSI process in Action 204, the wireless device 121 may determine a set of uplink transmission parameter values for the at least one uplink CSI process based on the received subset of uplink transmission parameter values and the determined quality of the uplink beamforming direction corresponding to the at least one uplink CSI process. Examples of received uplink transmission parameter values in a subset that may be indicated for the at least one uplink CSI process may comprise uplink frequency allocation, cyclic shift of demodulation reference signals, indication of cover code or orthogonal cover codes, number of layers, etc. Examples of uplink transmission parameter values that may be determined by the wireless device 121 may comprise a pre-coder, a Modulation and Coding Scheme, MCS, a number of layers, uplink transmit power, etc. Then, the wireless device 121 may transmit an uplink transmission in the wireless communications network 100 using the determined set of uplink transmission parameter values for the at least one uplink CSI process. It should also be noted that the received information in Action 204 may further also comprise information indicating to the wireless device 12 when to perform the uplink transmission.

According to some embodiments, the wireless device 121 may also transmit an uplink control message, wherein the uplink control message may comprise at least a subset of the determined set of uplink transmission parameter values for the at least one uplink CSI process. This means, for example, that the wireless device 121 may confirm, or suggest the use of, one or more of uplink transmission parameter values for the at least one uplink CSI process to the network node 110. In some embodiments, at least one uplink transmission parameter value of the transmission parameter values in the subset comprised in the uplink control message may be different from the uplink transmission parameter values in the subset comprised in the received information. This means, for example, that the wireless device 121 may suggest the use of one or more uplink transmission parameter values for the at least one uplink CSI process which the wireless device 121 consider more suitable than the uplink transmission parameter values in the subset comprised in the received information from the network node 110.

In some embodiments, the wireless device 121 may also select an uplink beamforming direction for an uplink transmission in the wireless communications network 100 using the determined quality of at least one uplink beamforming direction. This means that the wireless device 121 may use the determined quality of each of the uplink beamforming directions in order to select the most suitable uplink beamforming direction for an uplink transmission, for example, the uplink beamforming direction with the highest quality. In other words, the wireless device 121 may in this case autonomously select the uplink CSI processes to use based on reported quality of the uplink beamforming directions. It should be noted that selecting an uplink beamforming direction for an uplink transmission may comprise selecting a set of uplink transmission parameter values for the uplink transmission in a particular uplink beamforming direction. One example of such uplink transmission parameter values may be precoders and antenna weights. Then, the wireless device 121 may transmit an uplink transmission in the wireless communications network 100 using the selected uplink beamforming direction.

Also, in some embodiments, in case the wireless device 121 received information indicating an association between a downlink CSI process and an uplink CSI process of the one or more uplink CSI processes in Action 202, the wireless device 121 may here further use this association when selecting the uplink beamforming direction for the uplink transmission in the wireless communications network 100.

Furthermore, in some embodiments, the wireless device 12 may also control the power of an uplink transmission in the wireless communications network 100 using the determined quality of at least one uplink beamforming direction. This provides a power control mechanism which utilizes the determined quality of at least one uplink beamforming direction in order to improve the uplink power control in the wireless communications network 100.

For example, for the LTE Physical Uplink Shared Channel, PUSCH, the quality of an uplink beamforming direction may be determined as the beamforming gain, BF(k), for its corresponding uplink CSI process, k. This may then be included in the formula used for determining the LTE PUSCH power, such as, e.g.:

$$P_{PUSCH}(i,k) = \min\{P_{CMAX}, 10 \log_{10}(M_{PUSCH}(i)) + P_{O\_PUSCH}(j) + \alpha(j) \cdot PL - BF(k) + \Delta_{TF}(i) + f(i)\}$$

wherein
$P_{PUSCH}(i,k)$ is the LTE PUSCH power,
$P_{CMAX}$ is the configured maximum transmit power of the wireless device 121,
$M_{PUSCH}(i)$ is the number of resource blocks allocated for the wireless device 121, $P_{O\_PUSCH}(j)$ is a parameter consisting of the sum of a cell-specific and a user-specific part provided by higher layer,
$\alpha$ is cell-specific parameter configured by higher layers, also known as fractional pathloss compensation factor,
PL is the downlink pathloss estimate calculated in the wireless device 121,
$\Delta_{TF}(i)$ is a user-specific parameter provided by higher layers, and
f(i) is user-specific correction term controlled by TPC commands sent in uplink grants which are transmitted on the PDCCH.

Here, the path loss may, for example, be estimated on a downlink signal without consideration to the uplink beamforming gain. This is because the downlink signal will include the beam-forming gain of the network node 110 for sending downlink reference signals used by the wireless device 121 for estimating the path loss. It should also be noted that often, for other channels. $\alpha(j)=1$.

Alternatively, the beamforming gain, BF(k), for the corresponding uplink CSI process, k, may be implicitly included into the path loss component, PL(k), of the formula used for determining the LTE PUSCH power, such as, e.g.:

$$P_{PUSCH}(i,k) = \min\{P_{CMAX}, 10 \log_{10}(M_{PUSCH}(i)) + P_{O\_PUSCH}(j) + \alpha(j) \cdot PL(k) + \Delta_{TF}(i) + f(i)\}$$

This alternative may advantageously be performed in a multi connectivity situation wherein the wireless device 121 is not aware of how different uplink CSI processes relate to different network nodes. For example, this may be beneficial in that it may hide many complications in the network node 110 from the wireless device 121 which lead to a low complexity in the signaling between the network node 110 and the wireless device 121.

Example of embodiments of a method performed by a network node 110 for enabling a wireless device 121 to determine a quality of uplink beamforming directions in a wireless communications network 100 will now be described with reference to the flowchart depicted in FIG. 3. FIG. 3 is an illustrated example of actions or operations which may be taken by a network node 110 in the wireless communication network 100. The method may comprise the following actions.

Action 301

Optionally, the network node 110 may receive a request for configuration information indicating one or more uplink CSI processes for uplink beamforming directions. The request may be received from the wireless device 121. It should be noted that, in some case, the uplink CSI process capability of the wireless device 121 may not be known by the network node 110 until the network node 110 receives the request from the wireless device 121.

Action 302

The network node 110 transmits configuration information to the wireless device 121, said configuration information indicating one or more uplink CSI processes for uplink beamforming directions. The configuration information may be transmitted by the network node 110 in a downlink transmission to the wireless device 121, e.g. in response to the transmitted request in Action 301. As previously mentioned in embodiments with reference to FIG. 2, the configuration information may comprise a configuration of n=1, 2, ..., N number of uplink CSI processes, wherein N is an integer. Each uplink CSI process may specify an uplink transmission resource on which the wireless device 121 may transmit one or more reference signals, i.e. signals comprising reference symbols.

Action 303

After the transmission in Action 301, the network node 110 receives reference signals from the wireless device 121 for one or more uplink beamforming directions on uplink transmission resources of corresponding one or more uplink OSI processes. Thus, the network node 110 may use the reference signals to measure the uplink channel from the wireless device 121 for the corresponding uplink CSI process.

Action 304

Then, after receiving the reference signals in Action 303, the network node 110 determine one or more uplink CSI process reports using the received reference signals on the uplink transmission resources of the one or more uplink CSI processes. This means that the network node 110 may determine uplink CSI process reports for these uplink CSI processes in a similar way as wireless devices today determine CSI process reports for the downlink CSI processes in wireless communication networks. It should be noted that the network node 110 may determine the uplink CSI process reports taking into account knowledge about and information regarding other wireless devices and/or other network nodes in the wireless communications network 100. Here, it should also be noted that the uplink CSI process report may be explicit, such as, e.g. comprising a channel estimate which likely may be quantized, or partly explicit, such as, e.g. comprising singular values and right-singular vectors, but not left-singular vectors, based on a singular-value decomposition of the channel estimate.

In some embodiments, the determined one or more uplink CSI process reports may comprise the quality of at least one uplink beamforming direction. This means that, according to some embodiments, the uplink CSI process report of an uplink CSI process comprise the quality of a specific uplink beamforming direction associated with this uplink CSI process, whereby the wireless device 121 may determine the quality by checking the quality included in the uplink CSI process report.

Alternatively, in some embodiments, the uplink CSI process report of an uplink CSI process may comprise one or more parameters enabling the wireless device 121 to determine the quality of a specific uplink beamforming direction associated with this uplink CSI process on its own.

Action 305

After the determination in Action 303, the network node 110 transmits the determined one or more uplink CSI process reports to the wireless device 121. This enables the wireless device 121 to determine a quality of uplink beamforming directions in a wireless communications network 100 by using the transmitted uplink CSI reports. Also, in this way, the network node 110 may transmit an uplink CSI process report for each uplink beamforming direction, i.e. an uplink CSI report of each uplink CSI process corresponding to each uplink beamforming direction, for which the network node 110 received reference signals in Action 303.

In some embodiments, the network node 110 may also transmit, to the wireless device 121, information identifying at least one uplink CSI process and indicating a subset of uplink transmission parameter values for the at least one uplink CSI process. In this way, the network node 110 may, for example, control or inform the wireless device 121 about which specific uplink beamforming direction, thus which uplink transmission parameter values, to use for one or more uplink transmissions. This information may be transmitted in a separate downlink transmission, such as, e.g. in a grant message. This separate downlink transmission may be transmitted more often than the configuration information in Action 302, but may also occur at the same time, i.e. during the same Transmission Time Interval, TTI.

Also, in some embodiments, the network node 110 may further transmit, to the wireless device 121, information indicating when the wireless device 121 is to transmit the reference signals and/or the uplink transmission. In this way, the network node 110 may control the timing of transmissions of the reference signals and/or uplink transmissions from the wireless device 121. The network node 110 may specify this information in the transmitted configuration information in Action 302, or transmit this information in a separate transmission to the wireless device 121, such as, e.g. in a grant message.

In some embodiments, the network node 110 may further transmit, to the wireless device 121, information indicating an association between a downlink CSI process and an uplink CSI process of the one or more uplink CSI processes. This means that the network node 110 may transmit an indicator indicating that a particular uplink CSI process may be associated with a particular downlink CSI process. The network node 110 may specify this information in the transmitted configuration information in Action 302, or transmit this information in a separate transmission to the wireless device 121, such as, e.g. in a grant message.

In some embodiments, the network node 110 may receive information indicating a reception of reference signals from the wireless device 121 for one or more uplink beamforming directions on uplink transmission resources of corresponding uplink CSI processes by at least one other network node 111 in the wireless communications network 100. In this case, the network node 110 may also determine whether or not to perform joint reception of an uplink transmission from the wireless device 121 by the network node 110 and the at least one other network node 111 based on the received information. In other words, this means that the network node 110 may determine whether or not to interpret the reception of the transmission from the wireless device 121 in the at least one other network node 111 as a channel or as interference. This means that if joint reception is used, then the reception regarded as a channel and is used to receive uplink transmissions from the wireless device 121. Otherwise, the reception is regarded as interference and may be considered when selecting the uplink beamforming direction for the wireless device 121.

Additionally, the network node 110 may here, when joint reception of the transmission from the wireless device 121 is to be performed, determine one or more uplink CSI process for the joint reception of the uplink transmission from the wireless device 121 by both the network node 110 and the at least one other network node 111. Optionally, the network node 110 may, when joint reception of the transmission from the wireless device 121 is not to be performed, determining one or more uplink CSI process for the reception of the uplink transmission from the wireless device 121 by the network node 110 or the at least one other network node 111.

According to some embodiments, different sets of uplink CS processes may be used depending on whether or not joint reception of the transmission from the wireless device 121 by the more than one network node 110, 111 in the wireless communications network 100 is to be performed. This means, for example, that the network node 110 may signal to the wireless device 121 to use uplink CSI processes from a first set of uplink CSI processes when joint reception will be used for an uplink transmission, or to use uplink CSI processes from a second set of uplink CSI processes when joint reception will not be used for the uplink transmission.

For the purpose of illustrating some of the embodiments described herein, a first example scenario is shown in FIG. 4.

In this first example scenario, the wireless device 121 is located at a first position at time t0. At this first position, the quality of a first uplink beamforming direction 401 for uplink transmissions of the wireless device 121 may be higher than the quality of a second uplink beamforming direction 402 for uplink transmissions of the wireless device 121. This is illustrated by the dashed area in FIG. 4. However, as the wireless device 121 moves to a second position at time t1, the second uplink beamforming direction 402 for uplink transmissions of the wireless device 121 may experience a higher quality than the first uplink beamforming direction 401 for uplink transmissions of the wireless device 121. This is illustrated by the dotted area in FIG. 4. This means that, at different points in time, different uplink beamforming directions may have the highest quality for uplink transmissions of the wireless device 121. Hence, in order for the wireless device 121 to be able to, for example, select which uplink beamforming direction to use for an uplink transmissions of the wireless device 121, the wireless device 121 must be enabled to determine the quality of the different uplink beamforming directions.

Figure 5:
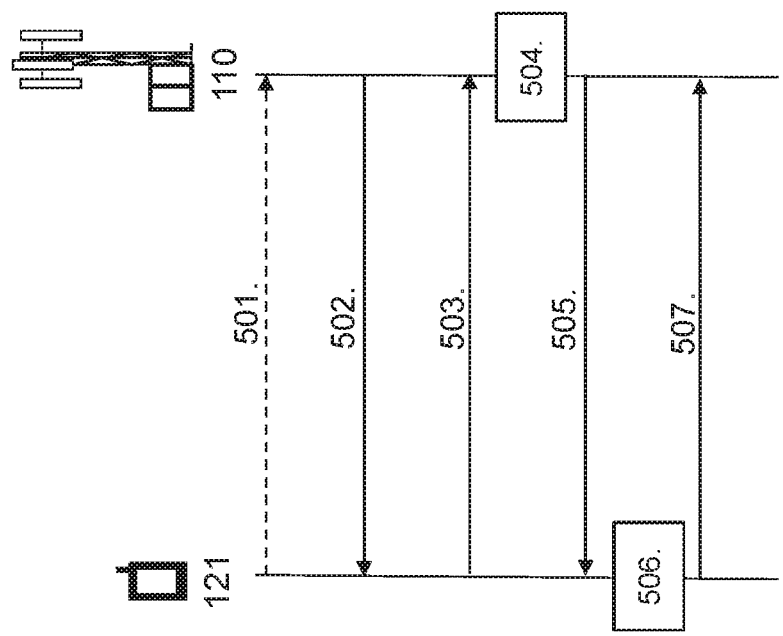
FIG. 5 is another schematic overview illustrating embodiments of uplink beamforming directions according to embodiments of network nodes and wireless devices.

FIG. 5 illustrates a signaling diagram of signaling that may be performed by embodiments of the wireless device 121 and the network node 110 in the first example scenario shown in FIG. 2.

Action 501. In this optional action, the wireless device 121 may transmit a request for the configuration information that indicates uplink CSI process for one or more uplink beamforming directions to the network node 110.

Action 502. The network node 110 may transmit configuration information indicating the uplink OSI processes for one or more uplink beamforming directions to the wireless device 121. Optionally, this may be performed by the network node 110 in response to the request received in Action 501.

Action 503. Thus, in response to receiving the configuration information in Action 502, the wireless device 121 may transmit reference signals for one or more uplink beamforming directions on uplink transmission resources of a corresponding uplink CSI process.

Action 504. When the reference signals from the wireless device 121 has been received by the network node 110, the network node 110 may determine uplink CSI process reports using the received reference signals on the uplink transmission resources for each of the corresponding uplink CSI processes of the one or more uplink beamforming directions.

Action 505. Then, the network node 110 may transmit the determined uplink CSI process reports for each of the corresponding uplink CSI processes of the one or more uplink beamforming directions to the wireless device 121. Optionally, the network node 110 may also transmit information identifying at least one uplink CSI process, i.e. implicitly indicating an uplink beamforming direction, and indicating a subset of uplink transmission parameter values for the at least one uplink CSI process.

Action 506. In response to receiving the determined uplink CSI process reports, the wireless device 121 may determine the quality of at least one of the one or more uplink beamforming directions using the received uplink CSI process reports. Optionally, in response to receiving the information identifying at least one uplink CSI process in Action 505, the wireless device 121 may determine a set of uplink transmission parameter values for the at least one uplink CSI process based on the received subset of uplink transmission parameter values and the determined quality of the uplink beamforming direction corresponding to the at least one uplink CSI process.

Action 507. Optionally, in response to determining a set of uplink transmission parameter values in Action 506, the wireless device 121 may transmit an uplink transmission in the wireless communications network 100 using the determined set of uplink transmission parameter values for the at least one uplink CSI process.

Figure 6:
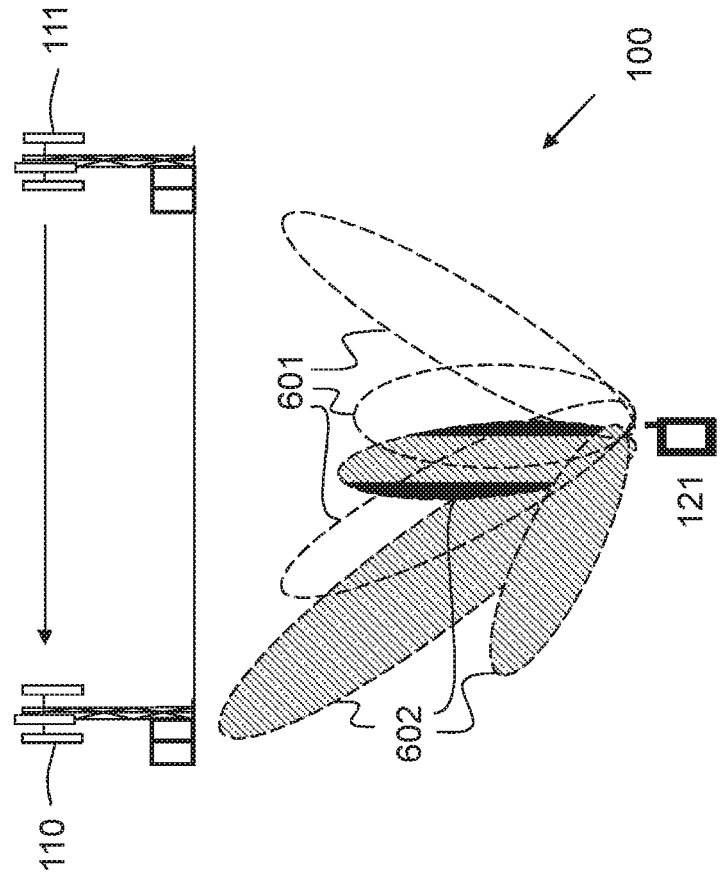
FIG. 6 is a flowchart depicting embodiments of a method in a wireless device.

For the purpose of further illustrating some of the embodiments described herein, a second example scenario is shown in FIG. 6. Here, the wireless device 121 is located within the coverage area of the network node 110 and at least one other network node 111. However, it should be noted that the principle described here may also be implemented for any two or more reception points of one or more network nodes in the wireless communications network 100.

In this second example scenario, both the network node 110 and at least one other network node 111 may receive the reference signals from the wireless device 121 on uplink transmission resources of a configured uplink CSI process. Hence, both the network node 110 and the at least one other network node 111 may measure and estimate their respective channel towards the wireless device 121. Then, the at least one other network node 111 may send its channel estimate to the network node 110. This means that the network node 110 determines the quality of the uplink beamforming directions based on whether joint reception is to be used or not. In other words, the network node 110 may determine whether or not to interpret the reception of the transmission from the wireless device 121 in the at least one other network node 111 as a channel or as an interference. This means, for example, that the uplink beamforming direction of an uplink transmission may be determined such that it is not only optimized with regards to the throughput of the wireless device 121, but also with regards to the amount of interference the uplink transmission will generate at the at least one other network node 111.

As shown in FIG. 6, in case the network node 110 determines that the channel between the wireless device 121 and the at least one other network node 111 is to be interpreted as a channel, i.e. joint reception is to be used, an uplink beamforming direction which takes this into consideration may be determined by the network node 110. This is illustrated by the transparent beams 601 in FIG. 6. Alternatively, in case the network node 110 determines that the channel between the wireless device 121 and the at least one other network node 111 is to be interpreted as interference, i.e. joint reception is not to be used, another uplink beamforming direction may be determined by the network node 110. This is illustrated by the dashed beams 603 in FIG. 6.

FIG. 7 illustrates a signaling diagram of signaling that may be performed by embodiments of the wireless device 121 and the network node 110 in the second example scenario shown in FIG. 6.

Action 701. The wireless device 121 may transmit reference signals for one or more uplink beamforming directions on uplink transmission resources of a corresponding uplink CSI process. In this case, the reference signals from the wireless device 121 may be received by the network node 110 and by another network node 111 in the wireless communications network 100.

Action 702. The network node 110 may then receive information, from the other network node 111, indicating a reception of reference signals from the wireless device 121 for one or more uplink beamforming directions on uplink transmission resources of corresponding uplink CSI processes by the other network node 111.

Action 703. Based on the received information from the other network node 111, the network node 110 may determine whether or not to perform joint reception of the uplink transmission from the wireless device 121 by the network node 110 and the other network node 111. Then, for example, in case joint reception of the uplink transmission from the wireless device 121 by the network node 110 and the other network node 111 is to be performed, the network node 110 may determine one or more uplink CSI processes for the joint reception of the transmission from the wireless device 121 by both the network node 110 and the other network node 111. Optionally, the network node 110 may determine one or more uplink CSI processes for the reception of the transmission from the wireless device 121 by the network node 110 or the other network node 111.

Action 704. The network node 110 may then transmit configuration information of the determined one or more uplink CSI processes to the wireless device 121.

Figure 8:
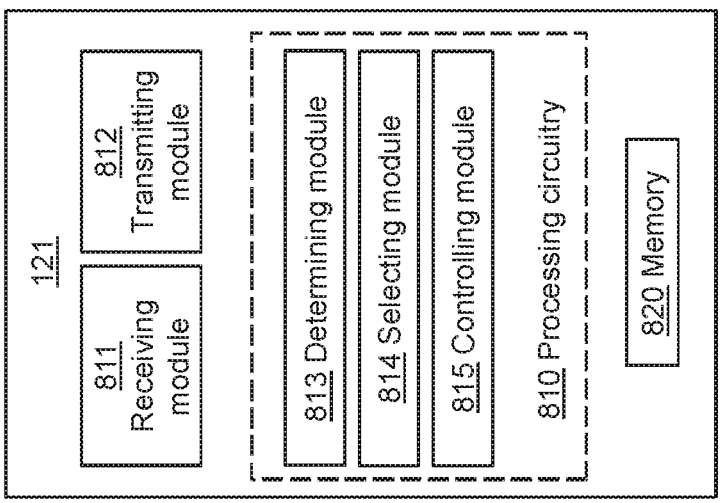
FIG. 8 is a block diagram depicting embodiments of a wireless device.

To perform the method actions in the wireless device 121 for determining the quality of uplink beamforming directions in a wireless communications network 100, the wireless device 121 may comprise the following arrangement depicted in FIG. 8. FIG. 8 shows a schematic block diagram of embodiments of a wireless device 121. The embodiments of the wireless device 121 described herein may be considered as independent embodiments or may be considered in any combination with each other to describe non-limiting examples of the example embodiments described herein.

The wireless device 121 may comprise processing circuitry 810, a memory 820 and at least one antenna (not shown). The processing circuitry 810 may also comprise a receiving module 811 and a transmitting module 812. The receiving module 811 and the transmitting module 812 may comprise Radio Frequency, RF, circuitry and baseband processing circuitry. The receiving module 811 and the transmitting module 812 may also form part of a transceiver. In particular embodiments, some or all of the functionality described above as being performed by the wireless device 121 may be provided by the processing circuitry 810 executing instructions stored on a computer-readable medium, such as, e.g. the memory 820 shown in FIG. 8. Alternative embodiments of the wireless device 121 may comprise additional components, such as, the determining module 813, the selecting module 814 and the controlling module 815, each responsible for providing its respective functionality necessary to support the embodiments described herein.

The wireless device 121 or processing circuitry 810 is configured to, or may comprise the receiving module 811 configured to, receive configuration information indicating one or more uplink CSI processes for uplink beamforming directions. Also, the wireless device 121 or processing circuitry 810 is configured to, or may comprise the transmitting module 812 configured to, transmit reference signals for one or more uplink beamforming directions on uplink transmission resources of corresponding one or more uplink CSI processes. Further, the wireless device 121 or processing circuitry 810 is configured to, or may comprise the receiving module 811 configured to, receive one or more uplink CSI process reports for the one or more uplink CSI processes. Furthermore, the wireless device 121 or processing circuitry 810 is configured to, or may comprise the determining module 813 configured to, determine the quality of at least one uplink beamforming direction using the one or more uplink CSI process reports.

In some embodiments, the wireless device 121 or processing circuitry 810 may further be configured to, or may comprise the transmitting module 812 being configured to, transmit a request for the configuration information that indicates one or more uplink CSI processes for uplink beamforming directions.

In some embodiments, the wireless device 121 or processing circuitry 810 may further be configured to, or may comprise the receiving module 811 being configured to, receive information identifying at least one uplink CSI process and indicating a subset of uplink transmission parameter values for the at least one uplink CSI process. In this case, according to some embodiments, the wireless device 121 or processing circuitry 810 may also be configured to, or may comprise the determining module 813 being configured to, determine a set of uplink transmission parameter values for the at least one uplink CSI process based on the received subset of uplink transmission parameter values and the determined quality of the uplink beamforming direction corresponding to the at least one uplink CSI process. Further, here, the wireless device 121 or processing circuitry 810 may further be configured to, or may comprise the transmitting module 812 being configured to, transmit an uplink transmission in the wireless communications network 100 using the determined set of uplink transmission parameter values for the at least one uplink CSI process.

In some embodiments, the wireless device 121 or processing circuitry 810 may further be configured to, or may comprise the transmitting module 812 being configured to, transmit an uplink control message, said uplink control message comprising at least a subset of the determined set of uplink transmission parameter values for the at least one uplink CSI process. In some embodiments, at least one uplink transmission parameter value of the transmission parameter values in the subset comprised in the uplink control message is different from the transmission parameter values in the subset comprised in the received grant message.

In some embodiments, the wireless device 121 or processing circuitry 810 may further be configured to, or may comprise the selecting module 814 being configured to, select an uplink beamforming direction for an uplink transmission in the wireless communications network 100 using the determined quality of at least one uplink beamforming direction. Here, the wireless device 121 or processing circuitry 810 may further be configured to, or may comprise the transmitting module 812 being configured to, transmit the uplink transmission in the wireless communications network 100 using the selected uplink beamforming direction. According to some embodiments, the wireless device 121 or processing circuitry 810 may further be configured to, or may comprise the selecting module 814 being configured to, receive information indicating an association between a downlink CSI process and an uplink CSI process of the one or more uplink CSI processes, and use the association when selecting the uplink beamforming direction for the uplink transmission in the wireless communications network 100.

In some embodiments, the wireless device 121 or processing circuitry 810 may be configured to, or may comprise the receiving module 811 configured to, receive information indicating when the wireless device 121 is to transmit the reference signals and/or perform the uplink transmission. In some embodiments, the wireless device 121 or processing circuitry 810 may be configured to, or may comprise the controlling module 815 configured to, control the power of an uplink transmission in the wireless communications network 100 using the determined quality of at least one uplink beamforming direction.

Furthermore, the embodiments for determining the quality of uplink beamforming directions in a wireless communications network 100 described above may be implemented through one or more processors, such as the processing circuitry 810 in the wireless device 121 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the wireless device 121. The computer program code may e.g. be provided as pure program code in the wireless device 121 or on a server and downloaded to the wireless device 121. Thus, it should be noted that the modules of the wireless device 121 may in some embodiments be implemented as computer programs stored in memory, e.g. in the memory modules 820 in FIG. 8, for execution by processors, e.g. the processing modules 810 of FIG. 8.

Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system on-a-chip (SoC).

Hence, in other words, various embodiments of the wireless device 121 may be set out by the following statements:

A wireless device 121 for determining the quality of uplink beamforming directions in a wireless communications network 100, the wireless device 121 comprising a receiving module 811 for receiving configuration information indicating one or more uplink CSI processes for uplink beamforming directions, a transmitting module 812 transmit reference signals for one or more uplink beamforming directions on uplink transmission resources of corresponding one or more uplink CSI processes, a receiving module 811 for receiving one or more uplink CSI process reports for the one or more uplink CSI processes, and a determining module 813 determine the quality of at least one uplink beamforming direction using the one or more uplink CSI process reports.

A wireless device 121 for determining the quality of uplink beamforming directions in a wireless communications network 100, the wireless device 121 comprising a receiver 811, a processor 810 and a memory 820, said memory 820 containing instructions executable by said processor 810, whereby said wireless device 121 is configured to receive configuration information indicating one or more uplink CSI processes for uplink beamforming directions, transmit reference signals for one or more uplink beamforming directions on uplink transmission resources of corresponding one or more uplink CSI processes, receive one or more uplink CSI process reports for the one or more uplink CSI processes, and determine the quality of at least one uplink beamforming direction using the one or more uplink CSI process reports.

Figure 9:
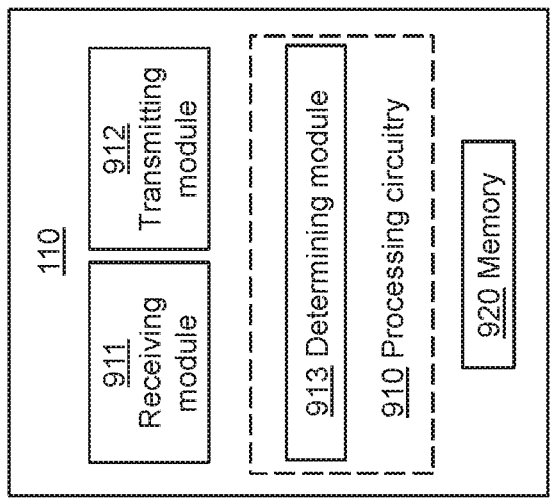
FIG. 9 is a block diagram depicting embodiments of a network node.

To perform the method actions in the network node 110 for enabling a wireless device 121 to determine a quality of uplink beamforming directions in a wireless communications network 100, the network node 110 may comprise the following arrangement depicted in FIG. 9. FIG. 9 shows a schematic block diagram of embodiments of a network node 110. The embodiments of the network node 110 described herein may be considered as independent embodiments or may be considered in any combination with each other to describe non-limiting examples of the example embodiments described herein.

The network node 110 may comprise a processing circuitry 910, a memory 920 and at least one antenna (not shown). The processing circuitry 910 may comprise a receiving module 911 and a transmitting module 912. The receiving module 911 and the transmitting module 912 may comprise Radio Frequency, RF, circuitry and baseband processing circuitry. The receiving module 811 and the transmitting module 812 may also form part of a transceiver. In particular embodiments, some or all of the functionality described above as being performed by the network node 110 may be provided by the processing circuitry 910 executing instructions stored on a computer-readable medium, such as the memory 920 shown in FIG. 9. Alternative embodiments of the wireless device 121 may comprise additional components, such as, the determining module 913 responsible for providing its functionality necessary to support the embodiments described herein.

The network node 110 or processing circuitry 910 is configured to, or may comprise the transmitting module 912 configured to, transmit configuration information to the wireless device 121, said configuration information indicating one or more uplink CSI processes for uplink beamforming directions. Also, the network node 110 or processing circuitry 910 is configured to, or may comprise the receiving module 911 configured to, receive reference signals from the wireless device 121 for one or more uplink beamforming directions on uplink transmission resources of corresponding uplink CSI processes. Further, the network node 110 or processing circuitry 910 is configured to, or may comprise the determining module 913 configured to, determine one or more uplink CSI process reports using the received reference signals on the uplink transmission resources of the uplink CSI processes. Further, the network node 110 or processing circuitry 910 is configured to, or may comprise the transmitting module 912 configured to, transmit the determined one or more uplink CSI process reports for the uplink CSI processes to the wireless device 121. In some embodiments, the determined one or more uplink CSI process reports comprises the quality of at least one uplink beamforming direction.

In some embodiments, the network node 110 or processing circuitry 910 may be configured to, or may comprise the receiving module 911 being configured to, receive a request for configuration information indicating one or more uplink CSI processes for uplink beamforming directions.

In some embodiments, the network node 110 or processing circuitry 910 may be configured to, or may comprise the transmitting module 912 being configured to, transmit, to the wireless device 121, information identifying at least one uplink CSI process and indicating a subset of uplink transmission parameter values for the at least one uplink CSI process. Also, in some embodiments, the network node 110 or processing circuitry 910 may be configured to, or may comprise the transmitting module 912 being configured to, transmit, to the wireless device 121, information indicating when the wireless device 121 is to transmit the reference signals and/or the uplink transmission. Further, in some embodiments, the network node 110 or processing circuitry 910 may be configured to, or may comprise the transmitting module 912 being configured to, transmit, to the wireless device 121, information indicating an association between a downlink CSI process and an uplink CSI process of the one or more uplink CSI processes.

In some embodiments, the network node 110 or processing circuitry 910 may be configured to, or may comprise the receiving module 911 being configured to, receive information indicating a reception of reference signals from the wireless device 121 for one or more uplink beamforming directions on uplink transmission resources of corresponding uplink CSI processes by at least one other network node 111 in the wireless communications network 100. In this case, the network node 110 or processing circuitry 910 may also be configured to, or may comprise the determining module 913 being configured to, determine whether or not to perform joint reception of an uplink transmission from the wireless device 121 by the network node 110 and the at least one other network node 111 based on the received information. Also, in some embodiments, the network node 110 or processing circuitry 910 may further be configured to, or may comprise the determining module 913 being further configured to, determine, when joint reception of the transmission from the wireless device 121 is to be performed, one or more uplink CSI process for the joint reception of the uplink transmission from the wireless device 121 by both the network node 110 and the at least one other network node 111. Optionally, in some embodiments, the network node 110 or processing circuitry 910 may further be configured to, or may comprise the determining module 913 being further configured to, determine, when joint reception of the transmission from the wireless device 121 is not to be performed, one or more uplink CSI process for the reception of the uplink transmission from the wireless device 121 by the network node 110 or the at least one other network node 111.

Furthermore, in some embodiments, different sets of uplink CSI processes is used depending on whether or not joint reception of the transmission from the wireless device 121 by the more than one network node 110, 111 in the wireless communications network 100 is to be performed.

In some embodiments, the network node 110 may be a radio base station 110 in the wireless communications network 100. Alternatively, the network node 110 may be another wireless device 122 in the wireless communications network 100.

Furthermore, the embodiments for enabling a wireless device 121 to determine a quality of uplink beamforming directions in a wireless communications network 100 described above may be implemented through one or more processors, such as the processing circuitry 910 in the network node 110 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the network node 110. The computer program code may e.g. be provided as pure program code in the network node 110 or on a server and downloaded to the network node 110. Thus, it should be noted that the modules of the network node 110 may in some embodiments be implemented as computer programs stored in memory, e.g. in the memory modules 920 in FIG. 9, for execution by processors, e.g. the processing modules 910 of FIG. 9.

Those skilled in the art will also appreciate that the processing circuitry 910 and the memory 920 described above may refer to a combination of analog and digital circuits, and/or one or more processors configured with software and/or firmware, e.g. stored in a memory, that when executed by the one or more processors such as the processing circuitry 920 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Hence, in other words, various embodiments of the network node 110 may be set out by the following statements:

A network node 110 for enabling a wireless device 121 to determine channel state measurements in a wireless communications network 100, the network node 110 comprising a transmitting module 912 for transmitting configuration information to the wireless device 121, said configuration information indicating one or more uplink channel state information, CSI, processes for uplink beamforming directions, a receiving module 911 for receiving reference signals from the wireless device 121 for one or more uplink beamforming directions on uplink transmission resources of corresponding uplink CSI processes, a determining module 913 for determining one or more uplink CSI process reports using the received reference signals on the uplink transmission resources of the uplink CSI processes, and the transmitting module 912 for transmitting the determined one or more uplink CSI process reports for the uplink CSI processes to the wireless device 121.

A network node 110 for enabling a wireless device 121 to determine a quality of uplink beamforming directions in a wireless communications network 100, the network node 110 comprising a transmitter 912, a processor 910 and a memory 920, said memory 920 containing instructions executable by said processor 910 whereby said network node 110 is configured to transmit configuration information to the wireless device 121, said configuration information indicating one or more uplink channel state information, CSI, processes for uplink beamforming directions, receive reference signals from the wireless device 121 for one or more uplink beamforming directions on uplink transmission resources of corresponding uplink CSI processes, determine one or more uplink CSI process reports using the received reference signals on the uplink transmission resources of the uplink CSI processes, and transmit the determined one or more uplink CSI process reports for the uplink CSI processes to the wireless device 121.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

3GPP Third Generation Partnership Project
UMTS Universal Mobile Telecommunications System
GSM Global System for Mobile Communications
WCDMA Wideband Code Division Multiple Access
HSPA High Speed Packet Access
LTE Long Term Evolution
RAN Radio Access Network
UTRAN UMTS terrestrial RAN
E-UTRAN Evolved Universal Terrestrial Radio Access Network
RF Radio Frequency
RS Reference Symbols
CQI Channel-Quality Indicator
CRS Cell-Specific Reference Symbol
CSI Channel-State Information
CSI-IM CSI Interference Measurement
CSI-RS CSI Reference Symbol
LTE Long Term Evolution
MIMO Multiple Input Multiple Output
PMI Pre-coding Matrix Indicator
PRB Physical Resource Block
RI Rank Indicator
RRC Radio Resource Control
TM Transmission Mode
UE User Equipment

The invention claimed is:

1. A method performed by a wireless device configured for operation in a wireless communications network, the method comprising:
receiving configuration information from the wireless communications network, indicating two or more uplink Channel State Information (CSI) processes, each uplink CSI process having associated uplink transmission resources;
transmitting reference signals in each of two or more uplink beamforming directions using, in each direction, the uplink transmission resources associated with a respective one of the two or more uplink CSI processes;
receiving one or more uplink CSI process reports from the wireless communications network, indicating CSI determined from the reference signals transmitted for each of the two or more uplink CSI processes;
selecting one of the two or more uplink beamforming directions based on comparing the indicated CSIs; and
performing an uplink transmission for the wireless communications network using the selected uplink beamforming direction.

2. The method according to claim 1, further comprising transmitting a request for the configuration information.

3. The method according to claim 1, further comprising receiving information indicating a subset of uplink transmission parameter values for at least one of the two or more uplink CSI processes, determining a set of uplink transmission parameter values for the at least one uplink CSI process, based on the received subset of uplink transmission parameter values and the CSI reported for the uplink beamforming direction corresponding to the at least one uplink CSI process, and transmitting an uplink transmission in the wireless communications network using the determined set of uplink transmission parameter values for the at least one uplink CSI process.

4. The method according to claim 3, further comprising transmitting an uplink control message, said uplink control message comprising at least a subset of the determined set of uplink transmission parameter values for the at least one uplink CSI process.

5. The method according to claim 4, wherein at least one uplink transmission parameter value of the transmission parameter values in the subset comprised in the uplink control message is different from the uplink transmission parameter values in the subset comprised in the received information.

6. The method according to claim 1, further comprising, for at least one of the uplink CSI processes, receiving information identifying an associated downlink CSI process, and determining the uplink beamforming direction to use for each of the at least one uplink CSI processes based on a downlink beamforming direction corresponding to the associated downlink CSI process.

7. The method according to claim 1, further comprising receiving information indicating when the wireless device is to transmit the reference signals and/or perform the uplink transmission.

8. The method according to claim 1, further comprising controlling the power of the uplink transmission in dependence on the CSI reported by the network for the uplink CSI process corresponding to the selected uplink beamforming direction.

9. A wireless device configured for operation in a wireless communications network, the wireless device comprising:
radiofrequency (RF) circuitry configured to receive downlink signals from the wireless communications network and transmit uplink signals for the wireless communications network; and processing circuitry operatively associated with the RF circuitry and configured to
receive configuration information from the wireless communications network, indicating two or more uplink Channel State Information (CSI) processes, each uplink CSI process having associated uplink transmission resources;
transmit reference signals in each of two or more uplink beamforming directions using, in each direction, the uplink transmission resources associated with a respective one of the two or more uplink CSI processes;
receive one or more uplink CSI process reports from the wireless communications network, indicating CSI determined from the reference signals transmitted for each of the two or more uplink CSI processes;
select one of the two or more uplink beamforming directions based on comparing the indicated CSIs; and
perform an uplink transmission for the wireless communications network using the selected uplink beamforming direction.

10. The wireless device according to claim 9, wherein the processing circuitry is further configured to transmit a request for the configuration information.

11. The wireless device according to claim 9, wherein the processing circuitry is further configured to receive information indicating a subset of uplink transmission parameter values for at least one of the two or more uplink CSI processes, determine a set of uplink transmission parameter values for the at least one uplink CSI process, based on the received subset of uplink transmission parameter values and the CSI reported for the uplink beamforming direction corresponding to the at least one uplink CSI process, and transmit an uplink transmission in the wireless communications network using the determined set of uplink transmission parameter values for the at least one uplink CSI process.

12. The wireless device according to claim 11, wherein the processing circuitry is further configured to transmit an uplink control message, said uplink control message comprising at least a subset of the determined set of uplink transmission parameter values for the at least one uplink CSI process.

13. The wireless device according to claim 12, wherein at least one uplink transmission parameter value of the transmission parameter values in the subset comprised in the uplink control message is different from the transmission parameter values in the subset comprised in the received grant message.

14. The wireless device according to claim 9, wherein, for at least one of the uplink CSI processes, the processing circuitry is further configured to receive information identifying an associated downlink CSI process, and determine the uplink beamforming direction to use for each of the at least one CSI processes based on a downlink beamforming direction corresponding to the associated downlink CSI process.

15. The wireless device according to claim 9, wherein the processing circuitry is further configured to receive information indicating when the wireless device is to transmit the reference signals and/or perform the uplink transmission.

16. The wireless device according to claim 9, wherein the processing circuitry is further configured to control the power of the uplink transmission in dependence on the CSI reported by the network for the uplink CSI process corresponding to the selected uplink beamforming direction.

17. The wireless device according to claim 9, wherein the processing circuitry comprises a processor and a memory, wherein the memory contains instructions executable by the processor.

18. A method performed by a network node configured for operation in a wireless communications network, the method comprising:
transmitting configuration information to a wireless device, indicating two or more uplink Channel State Information (CSI) processes, each uplink CSI process being allocated for use in a respective uplink beamforming direction and having associated uplink transmission resources;
receiving reference signals from the wireless device transmitted on the respectively associated uplink transmission resources of the two or more uplink CSI processes;
determining CSI for each of the two or more uplink CSI processes, based on the reference signals received for each uplink CSI process; and
transmitting one or more uplink CSI process reports to the wireless device, indicating the CSI for each of the two or more uplink CSI processes, and thereby enabling the wireless device to select one of the respective uplink beamforming directions.

19. The method according to claim 18, further comprising transmitting the configuration information responsive to receiving a request for the configuration information.

20. The method according to claim 18, further comprising transmitting information to the wireless device identifying at least one of the two or more uplink CSI processes and indicating a subset of uplink transmission parameter values for the at least one uplink CSI process.

21. The method according to claim 18, further comprising transmitting, to the wireless device, information indicating when the wireless device is to transmit the reference signals or an uplink transmission made by the wireless device in one of the uplink beamforming directions corresponding to the uplink CSI process reports.

22. The method according to claim 18, further comprising indicating one or more of the respective uplink beamforming directions by transmitting information to the wireless device that associates one or more respective ones of the uplink CSI processes with corresponding downlink CSI processes, each such downlink CSI process having an associated downlink beamforming direction.

23. The method according to claim 18, further comprising receiving information indicating that another network node received the reference signals transmitted by the wireless device on the uplink transmission resources of one or more of the uplink CSI processes and using the information to determine whether to perform joint reception of an uplink transmission from the wireless device with the other network node.

24. The method according to claim 23, further comprising, when joint reception of the transmission from the wireless device is to be performed, determining one or more uplink CSI processes for the joint reception of the uplink transmission from the wireless device by both the network node and the other network node.

25. The method according to claim 23, further comprising, when joint reception of the transmission from the wireless device is not to be performed, determining one or more uplink CSI processes for the reception of the uplink transmission from the wireless device by the network node or the other network node.

26. The method according to claim 23, wherein different sets of uplink CSI processes are used depending on whether or not joint reception of the transmission from the wireless device is to be performed.

27. A network node configured for operation in a wireless communications network, the network node comprising
radiofrequency (RF) circuitry configured for transmitting downlink signals to a wireless device and receiving uplink signals from the wireless device; and
processing circuitry operatively associated with the RF circuitry and configured to:
transmit configuration information to a wireless device, indicating two or more uplink Channel State Information (CSI) processes, each uplink CSI process being allocated for use in a respective uplink beamforming direction and having associated uplink transmission resources;
receive reference signals from the wireless device transmitted on the respectively associated uplink transmission resources of the two or more uplink CSI processes;
determine CSI for each of the two or more uplink CSI processes, based on the reference signals received for each uplink CSI process; and
transmit one or more uplink CSI process reports to the wireless device, indicating the CSI for each of the two or more uplink CSI processes, and thereby enabling the wireless device to select one of the respective uplink beamforming directions.

28. The network node according to claim 27, wherein the processing circuitry is further configured to transmit the configuration information responsive to receiving a request for the configuration information.

29. The network node according to claim 27, wherein the processing circuitry is further configured to transmit information to the wireless device identifying at least one of the two or more uplink CSI processes and indicating a subset of uplink transmission parameter values for the at least one uplink CSI process.

30. The network node according to claim 27, wherein the processing circuitry is further configured to transmit information to the wireless device indicating when the wireless device is to transmit the reference signals or an uplink transmission made by the wireless device in one of the uplink beamforming directions corresponding to the uplink CSI process reports.

31. The network node according to claim 27, wherein the processing circuitry is further configured to indicate one or more of the respective uplink beamforming directions by transmitting information to the wireless device that associates one or more respective ones of the uplink CSI processes with corresponding downlink CSI processes, each such downlink CSI process having an associated downlink beamforming direction.

32. The network node according to claim 27, wherein the processing circuitry is further configured to receive information indicating that another network node received the reference signals transmitted by the wireless device on the uplink transmission resources of one or more of the uplink CSI processes and using the information to determine whether to perform a joint reception of an uplink transmission from the wireless device with the other network node.

33. The network node according to claim 32, wherein the processing circuitry is further configured to, when joint reception of the transmission from the wireless device is to be performed, determine one or more uplink CSI processes for the joint reception of the uplink transmission from the wireless device by both the network node and the other network node.

34. The network node according to claim 32, wherein the processing circuitry further configured to, when joint reception of the transmission from the wireless device is not to be performed, determine one or more uplink CSI processes for the reception of the uplink transmission from the wireless device by the network node or the other network node.

35. The network node according to claim 32, wherein the processing circuitry is further configured to use different sets of uplink CSI processes depending on whether or not joint reception of the transmission from the wireless device is to be performed.

36. The network node according to claim 27, wherein the network node is a radio base station in the wireless communications network.

37. The network node according to claim 27, wherein the network node is another wireless device in the wireless communications network.

38. The network node according to claim 27, wherein the processing circuitry comprises a processor and a memory, wherein the memory contains instructions executable by the processor.

* * * * *